(12) United States Patent
Wang et al.

(10) Patent No.: US 12,172,303 B2
(45) Date of Patent: Dec. 24, 2024

(54) ROBOT TEACHING BY DEMONSTRATION WITH VISUAL SERVOING

(71) Applicant: FANUC CORPORATION, Yamanashi (JP)

(72) Inventors: Kaimeng Wang, Fremont, CA (US); Tetsuaki Kato, Fremont, CA (US)

(73) Assignee: FANUC CORPORATION, Yamanashi (JP)

( * ) Notice: Subject to any disclaimer, the term of this patent is extended or adjusted under 35 U.S.C. 154(b) by 594 days.

(21) Appl. No.: 17/457,688

(22) Filed: Dec. 6, 2021

(65) Prior Publication Data

US 2023/0173660 A1  Jun. 8, 2023

(51) Int. Cl.
| | | |
|---|---|---|
| *B25J 9/00* | (2006.01) | |
| *B25J 9/16* | (2006.01) | |
| *B25J 19/02* | (2006.01) | |
| *G06T 7/60* | (2017.01) | |
| *G06T 7/70* | (2017.01) | |
| *G06V 40/10* | (2022.01) | |
| *G06V 40/20* | (2022.01) | |

(52) U.S. Cl.
CPC ........... *B25J 9/0081* (2013.01); *B25J 9/1612* (2013.01); *B25J 9/1664* (2013.01); *B25J 9/1697* (2013.01); *B25J 19/023* (2013.01); *G06T 7/60* (2013.01); *G06T 7/70* (2017.01); *G06V 40/10* (2022.01); *G06V 40/28* (2022.01); *G06T 2207/10028* (2013.01); *G06T 2207/20132* (2013.01)

(58) Field of Classification Search
CPC ...... B25J 9/0081; B25J 9/1612; B25J 9/1664; B25J 9/1697; B25J 19/023; G06T 7/60; G06T 7/70; G06T 2207/10028; G06T 2207/20132; G06V 40/10; G06V 40/28
See application file for complete search history.

(56) References Cited

U.S. PATENT DOCUMENTS

| | | | | |
|---|---|---|---|---|
| 9,764,475 | B2 * | 9/2017 | Suzuki | .................. B25J 9/1697 |
| 11,826,908 | B2 * | 11/2023 | Fuhlbrigge | ............ B25J 9/0081 |
| 2011/0305398 | A1 * | 12/2011 | Sakakibara | ............ G06V 40/28 |
| | | | | 382/203 |
| 2021/0114221 | A1 * | 4/2021 | Suzuki | ................. B25J 15/0253 |
| 2021/0316449 | A1 | 10/2021 | Wang et al. | |
| 2022/0203517 | A1 * | 6/2022 | Iwahara | ................. G06V 20/52 |

\* cited by examiner

*Primary Examiner* — Kira Nguyen
(74) *Attorney, Agent, or Firm* — John A. Miller; Shumaker, Loop & Kendrick, LLP

(57) ABSTRACT

A method for teaching and controlling a robot to perform an operation based on human demonstration with images from a camera. The method includes a demonstration phase where a camera detects a human hand grasping and moving a workpiece to define a rough trajectory of the robotic movement of the workpiece. Line features or other geometric features on the workpiece collected during the demonstration phase are used in an image-based visual servoing (IBVS) approach which refines a final placement position of the workpiece, where the IBVS control takes over the workpiece placement during the final approach by the robot. Moving object detection is used for automatically localizing both object and hand position in 2D image space, and then identifying line features on the workpiece by removing line features belonging to the hand using hand keypoint detection.

20 Claims, 7 Drawing Sheets

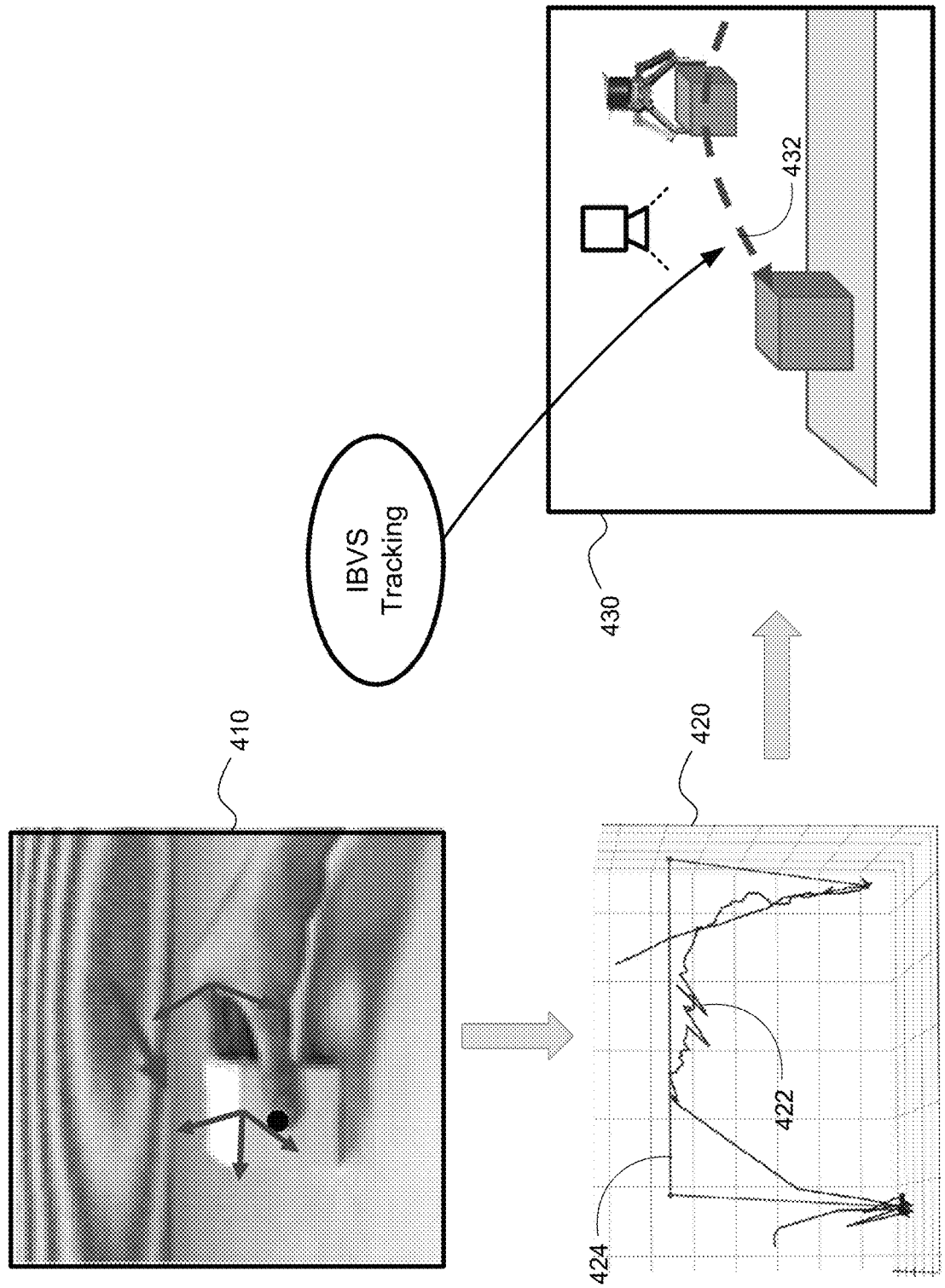

ROBOT TEACHING BY DEMONSTRATION WITH VISUAL SERVOING

BACKGROUND

Field

The present disclosure relates to the field of industrial robot programming and, more particularly, to a method for programming a robot to perform a workpiece pick/move/place operation, including a demonstration phase where a camera detects a human hand grasping and moving the workpiece to define a rough trajectory, and geometric features on the workpiece collected during the demonstration phase are used in an image-based visual servoing refinement of a final placement position of the workpiece.

Discussion of the Related Art

The use of industrial robots to repeatedly perform a wide range of manufacturing, assembly and material movement operations is well known. However, teaching a robot to perform even a fairly simple operation—such as picking up a workpiece in a random position and orientation on a conveyor and moving the workpiece to a container or a second conveyor—has been unintuitive, time-consuming and/or costly using conventional methods.

Robots have traditionally been taught to perform pick and place operations of the type described above by a human operator using a teach pendant. The teach pendant is used by the operator to instruct the robot to make incremental moves—such as "jog in the X-direction" or "rotate gripper about local Z-axis"—until the robot and it's gripper are in the correct position and orientation to grasp the workpiece. Then the robot configuration and the workpiece position and pose are recorded by the robot controller to be used for the "pick" operation. Similar teach pendant commands are then used to define the "move" and "place" operations. However, the use of a teach pendant for programming a robot is often found to be unintuitive, error-prone and time-consuming, especially to non-expert operators.

Another known technique of teaching a robot to perform a pick and place operation is the use of a motion capture system. A motion capture system consists of multiple cameras arrayed around a work cell to record positions and orientations of a human operator and a workpiece as the operator manipulates the workpiece. The operator and/or the workpiece may have uniquely recognizable marker dots affixed in order to more precisely detect key locations on the operator and the workpiece in the camera images as the operation is performed. However, motion capture systems of this type are costly, and are difficult and time-consuming to set up and configure precisely so that the recorded positions are accurate.

Robot teaching by human demonstration is also known, but may lack the positional accuracy needed for precise placement of the workpiece, as is needed for applications such as component installation and assembly.

In light of the circumstances described above, there is a need for an improved robot teaching technique which is simple and intuitive for a human operator to perform and has the precision needed for robotic installation and assembly operations.

SUMMARY

In accordance with the teachings of the present disclosure, a method for teaching and controlling a robot to perform an operation based on human demonstration with images from a camera is disclosed. The method includes a demonstration phase where a camera detects a human hand grasping and moving a workpiece to define a rough trajectory of the robotic movement of the workpiece. Line features or other geometric features on the workpiece collected during the demonstration phase are used in an image-based visual servoing (IBVS) approach which refines a final placement position of the workpiece, where the IBVS control takes over the workpiece placement during the final approach by the robot. Moving object detection is used for automatically localizing both object and hand position in 2D image space, and then identifying line features on the workpiece by removing line features belonging to the hand using hand keypoint detection.

Additional features of the presently disclosed devices and methods will become apparent from the following description and appended claims, taken in conjunction with the accompanying drawings.

BRIEF DESCRIPTION OF THE DRAWINGS

FIG. 4 is an illustration showing a basic concept of a technique for robot teaching by human demonstration with image-based visual servoing, according to an embodiment of the present disclosure;

DETAILED DESCRIPTION OF THE EMBODIMENTS

Figure 1:
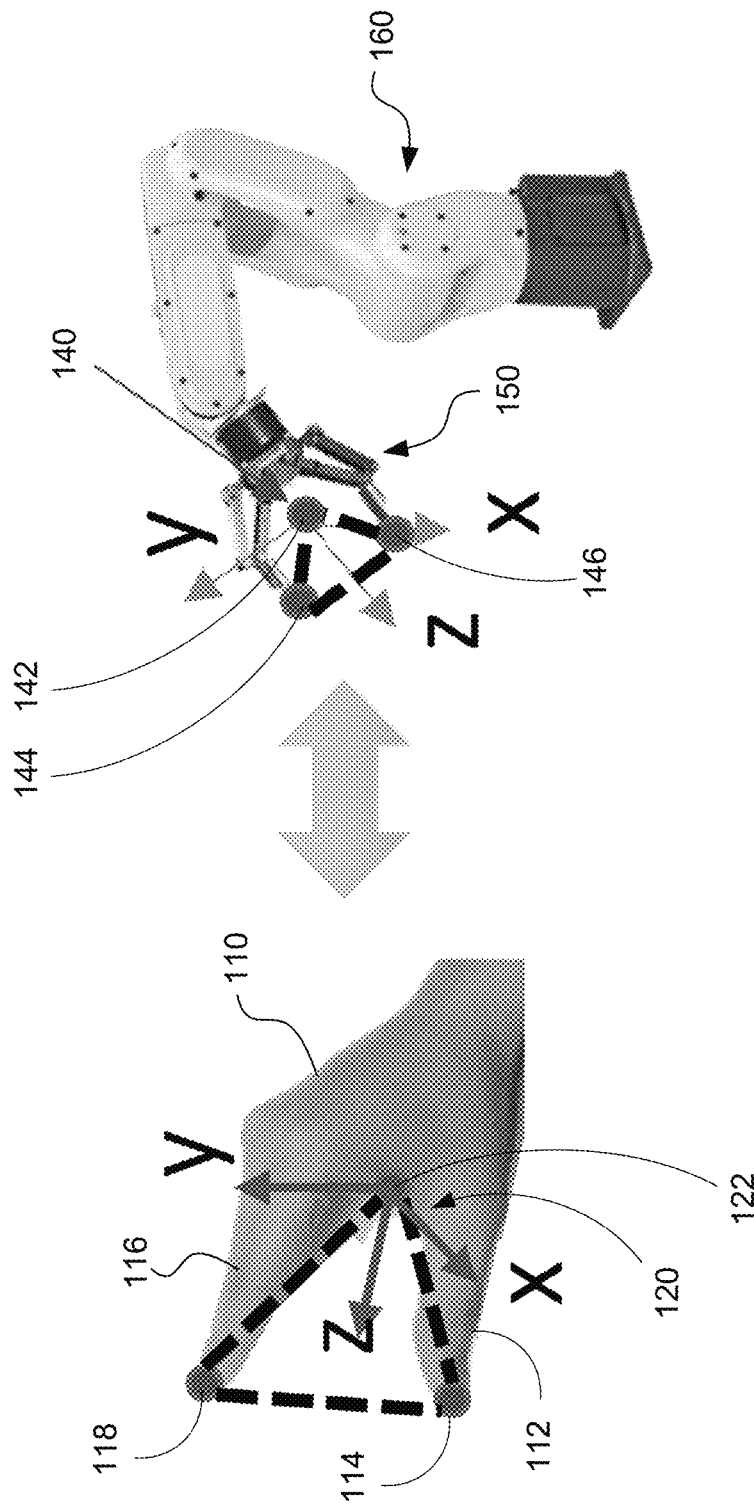
FIG. 1 is an illustration of how images of a human hand are analyzed to determine a corresponding position and orientation of a finger-type robotic gripper, according to an embodiment of the present disclosure.

The following discussion of the embodiments of the disclosure directed to teaching a robot by human demonstration with image-based visual servoing is merely exemplary in nature, and is in no way intended to limit the disclosed devices and techniques or their applications or uses.

It is well known to use industrial robots for a variety of manufacturing, assembly and material movement operations. One known type of robotic operation is sometimes known as "pick, move and place", where a robot picks up a part or workpiece from a first location, moves the part and places it at a second location. The first location might be a conveyor belt where randomly oriented parts are streaming, such as parts which were just taken from a mold. The second location may be another conveyor leading to a different operation, or may be a shipping container, but in either case, the part needs to be placed at a particular location and oriented in a particular pose at the second location.

In order to perform pick, move and place operations of the type described above, a camera is typically used to determine the position and orientation of incoming parts, and a robot must be taught to grasp the part in a specific manner using a finger-type gripper or a magnetic or suction cup gripper. Teaching the robot how to grasp the part according to the part's orientation has traditionally been done by a human operator using a teach pendant. The teach pendant is used by the operator to instruct the robot to make incremental moves—such as "jog in the X-direction" or "rotate gripper about local Z-axis"—until the robot and it's gripper are in the correct position and orientation to grasp the workpiece. Then the robot configuration and the workpiece position and pose are recorded by the robot controller to be used for the "pick" operation. Similar teach pendant commands are then used to define the "move" and "place" operations. However, the use of a teach pendant for programming a robot is often found to be unintuitive, error-prone and time-consuming, especially to non-expert operators.

Another known technique of teaching a robot to perform a pick, move and place operation is the use of a motion capture system. A motion capture system consists of multiple cameras arrayed around a work cell to record positions and orientations of a human operator and a workpiece as the operator manipulates the workpiece. The operator and/or the workpiece may have uniquely recognizable marker dots affixed in order to more precisely detect key locations on the operator and the workpiece in the camera images as the operation is performed. However, motion capture systems of this type are costly, and are difficult and time-consuming to set up and configure precisely so that the recorded positions are accurate.

Robot teaching by human demonstration is also known, where one or more camera captures images of the human hand(s) moving the workpiece from a start (pick) location to a destination (place) location. Techniques for robot teaching by human demonstration were disclosed in U.S. patent application Ser. No. 16/843,185, titled ROBOT TEACHING BY HUMAN DEMONSTRATION, filed Apr. 8, 2020 and commonly assigned with the present application, and herein incorporated by reference in its entirety. The aforementioned application is hereinafter referred to as "the '185 application".

The techniques of the '185 application work well when fine precision is not needed in placement of the workpiece. However, in precision placement applications such as robotic installation of a component into an assembly, uncertainly in the grasp pose of the workpiece in the hand can cause problems. Thus, a technique is needed for improving the precision of the workpiece placement. The present disclosure accomplishes this by using image-based visual servoing (IBVS) to refine the workpiece placement into a target location in an assembly, and further enhances the IBVS approach by identifying the line features that belongs to the workpiece automatically.

FIG. 1 is an illustration of how images of a human hand are analyzed to determine a corresponding position and orientation of a finger-type robotic gripper, as disclosed in the '185 application and used in an embodiment of the present disclosure. A hand 110 has a hand coordinate frame 120 defined as being attached thereto. The hand 110 includes a thumb 112 with a thumb tip 114, and a forefinger 116 with a forefinger tip 118. Other points on the thumb 112 and the forefinger 116 may also be identified in the camera images, such as the locations of the base of the thumb 112 and the forefinger 116 and the first knuckle of the thumb 112 and the forefinger 116, etc.

A point 122 is located midway between the base of the thumb 112 and the base of the forefinger 116, where the point 122 is defined as the origin of the hand coordinate frame 120. Other real or derived structural points of the hand 110 may be defined as the origin point 122. The orientation of the hand coordinate frame 120 may be defined using any convention which is suitable for correlation to the robotic gripper orientation. For example, the Y axis of the hand coordinate frame 120 may be defined as being normal to the plane of the thumb 112 and the forefinger 116 (that plane being defined by the points 114, 118 and 122). Accordingly, the X and Z axes lie in the plane of the thumb 112 and the forefinger 116. Further, the Z axis may be defined as bisecting the angle made by the thumb 112 and the forefinger 116 (the angle 114-122-118). The X axis orientation may then be found by the right hand rule from the known Y and Z axes. As mentioned above, the conventions defined here are merely exemplary, and other coordinate frame orientations may be used instead. The point is that a coordinate frame position and orientation may be defined based on key recognizable points on the hand, and that coordinate frame position and orientation can be correlated to a robotic gripper position and orientation.

A camera (not shown in FIG. 1; discussed later) may be used to provide images of the hand 110, where the images can then be analyzed to determine the spatial positions (such as in a work cell coordinate frame) of the thumb 112 and the forefinger 116, including the thumb tip 114 and the forefinger tip 118 along with the knuckles, and therefore the origin location 122 and orientation of the hand reference frame 120. In FIG. 1, the location and orientation of the hand reference frame 120 are correlated to a gripper coordinate frame 140 of a gripper 150 attached to a robot 160. The gripper coordinate frame 140 has an origin 142 which corresponds to the origin 122 of the hand reference frame 120, and points 144 and 146 which correspond to the forefinger tip 118 and the thumb tip 114, respectively. Thus, the two fingers of the finger-type gripper 150 are in the X-Z plane of the gripper coordinate frame 140, with the Z axis bisecting the angle 146-142-144.

The origin 142 of the gripper coordinate frame 140 may also be defined as the tool center point of the robot 160. The tool center point is a point whose location and orientation are known to the robot controller, where the controller can provide command signals to the robot 160 to move the tool center point and its associated coordinate frame (the gripper coordinate frame 140) to a defined location and orientation.

FIG. 1 illustrates how images of a hand correspond to a finger-type robotic gripper. Similar techniques can be used to correlate a human demonstrator's hand to a position and orientation of a suction-cup type gripper, or other gripper types.

Figure 2:
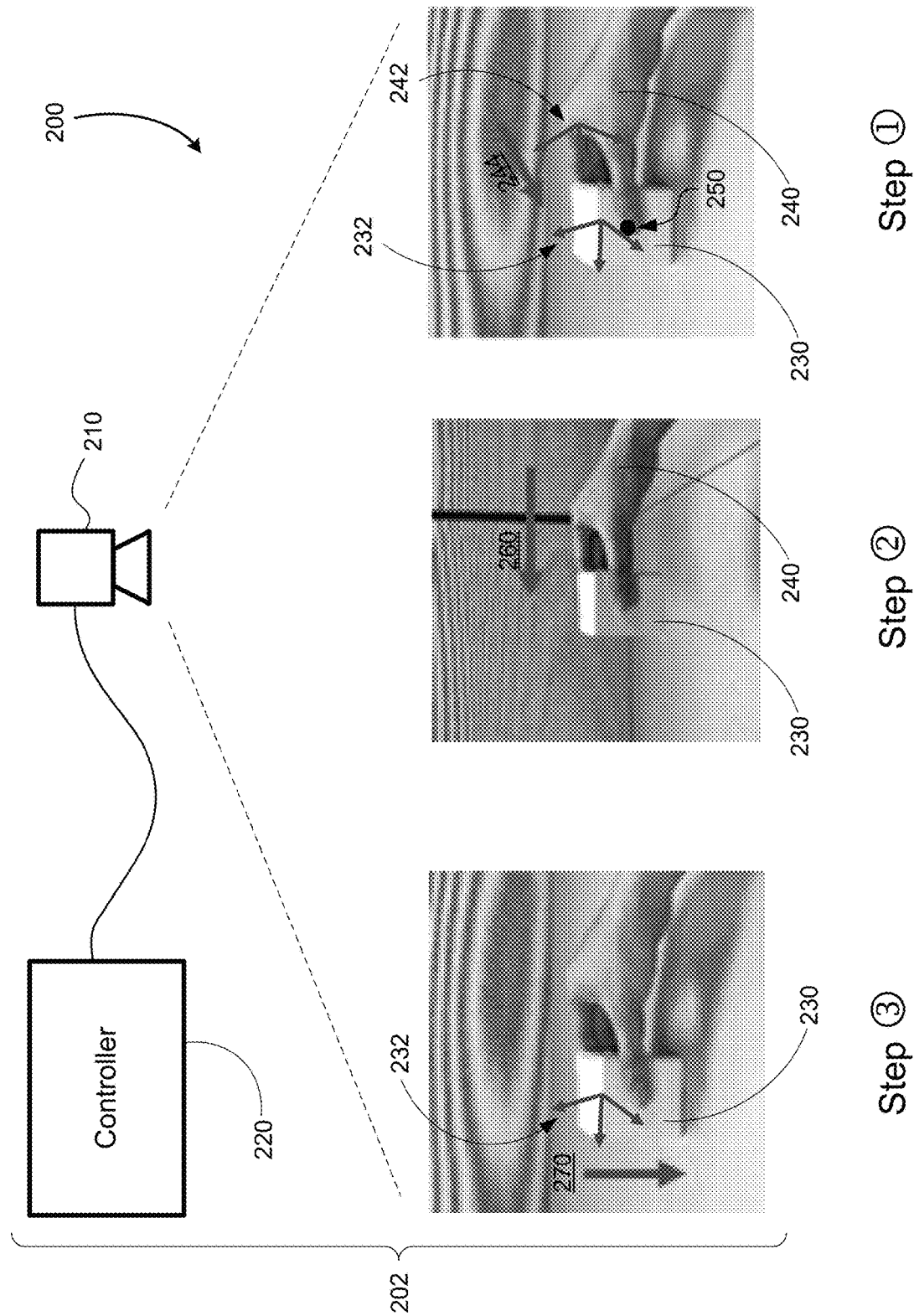
FIG. 2 is an illustration of a system and steps for teaching a robot to perform a pick and place operation using camera images of a human hand and workpiece, according to an embodiment of the present disclosure.

FIG. 2 is an illustration of a system 200 and steps for teaching a robot to perform a pick and place operation using camera images of a human hand, as disclosed in the '185 application and used in an embodiment of the present disclosure. The teaching phase illustrated in FIG. 2 is performed in a work cell 202. The work cell 202 includes a camera 210 for taking images of the teaching steps. The camera 210 may be a three-dimensional (3D) camera or two-dimensional (2D) camera—as long as it is capable of identifying coordinates of specific points and features of the hand, such as the fingertip, thumb tip and knuckle joints discussed earlier. Techniques for using a 3D camera for hand pose detection, and different techniques for using a 2D camera for hand pose detection, are discussed in detail in the '185 application. The camera 210 is configured to provide images of the portion of the work cell 202 where the part movement activity is taking place (all of the Steps ①-③ discussed below).

The camera 210 communicates with a robot controller 220. The controller 220 analyzes images of the teaching steps and generates robot programming commands as discussed below, where the robot programming commands are used to control motion of a robot performing the pick and place operation during a replay or execution phase. A separate computer could also be provided the between the camera 210 and the controller 220, where this separate computer would analyze camera images and communicate a gripper position or final trajectory to the controller 220. The teaching phase of FIG. 2 consists of three steps: in a Pick step (Step ①), a position and pose (pose is interchangeable terminology for orientation) of a workpiece are determined, and a position and pose of a hand grasping the workpiece are determined; in a Move step (Step ②), the position of the workpiece and the hand are tracked as the workpiece is moved from the Pick location to a Place location; in a Place step (Step ③), the position and pose of the workpiece are used to place the workpiece in its destination (Place) location. The steps are discussed below.

In Step ① (Pick), camera images are used to identify a position and pose of a workpiece 230. If workpieces are streaming inbound on a conveyor, then one coordinate (such as Z) of the position of the workpiece 230 is tracked according to a conveyor position index. The workpiece 230 shown in FIG. 2 is a simple cube; however, any type or shape of the workpiece 230 may be identified from camera images. For example, if the workpiece 230 is known to be a particular injection molded part, and may have any random orientation and position on the conveyor, the images from the camera 210 can be analyzed to identify key features of the workpiece 230 and from those features determine a position and orientation of a workpiece coordinate frame 232. The workpiece 230 may also be a component part to be installed in an assembly, where the component part is provided in any suitable fashion (individually or in multiples) for pickup by the robot.

Still at Step ① (Pick), camera images are also used to identify a position and pose of a hand 240 as it grasps the workpiece 230. The images of the hand 240 are analyzed to determine a position and orientation of a hand coordinate frame 242, in the manner discussed above with respect to FIG. 1 and described in detail (two different techniques) in the '185 application. The hand 240 approaches the workpiece 230 in a direction shown by arrow 244. When the thumb tip contacts the workpiece 230 as shown at point 250 and the fingertip contacts the workpiece 230 (this contact point not visible), the controller 220 stores all of the data from this particular image as the Pick data. The Pick data includes a position and pose of the workpiece 230 as defined by its workpiece coordinate frame 232 and a position and pose of the hand 240 as defined by its hand coordinate frame 242.

In Step ② (Move), camera images are used to track the position of both the workpiece 230 and the hand 240 as they move along a path 260. Multiple images of the workpiece 230 and the hand 240 are recorded to define the path 260, which it typically not a straight line. For example, the path 260 may comprise a long, sweeping curve, or the path 260 may involve moving the workpiece 230 up and over a barrier of some sort. In any case, the path 260 includes multiple points defining the position (and optionally orientation) of the workpiece 230 and the hand 240 during the Move step. The same techniques discussed previously are used to identify the position and pose of the workpiece coordinate frame 232 and the position and pose of the hand coordinate frame 242 from the camera images. The hand pose determination techniques are also discussed in detail in the '185 application.

In Step ③ (Place), camera images are used to identify the final position and pose of the workpiece 230 (as defined by its workpiece coordinate frame 232) after it is placed in its destination location as shown by arrow 270. The same techniques discussed previously are used to identify the position and pose of the workpiece coordinate frame 232 from the camera images. When the thumb tip and the fingertip break contact with the workpiece 230, the controller 220 stores the workpiece coordinate frame data from this particular image as the Place data. The Place data may also be recorded and stored based on the workpiece 230 having stopped moving—that is, the workpiece coordinate frame 232 being in the exact same position and pose for a period of time (such as 1-2 seconds).

The steps to determine hand pose from the 3D coordinates of hand key points, described above, may be performed on a robot controller such as the controller 220 of FIG. 2, or a separate computer in communication with the controller 220. Techniques for computing the 3D coordinates of the hand key points, using different types and numbers of cameras, were disclosed in the '185 application. While FIG. 2 illustrates the steps for human demonstration of a pick-move-place operation to define a trajectory in a robot teaching phase (without involvement of a robot), a corresponding set of steps are used by a robot (without involvement of a human demonstrator) during the replay or robot execution phase, discussed below.

Figure 3:
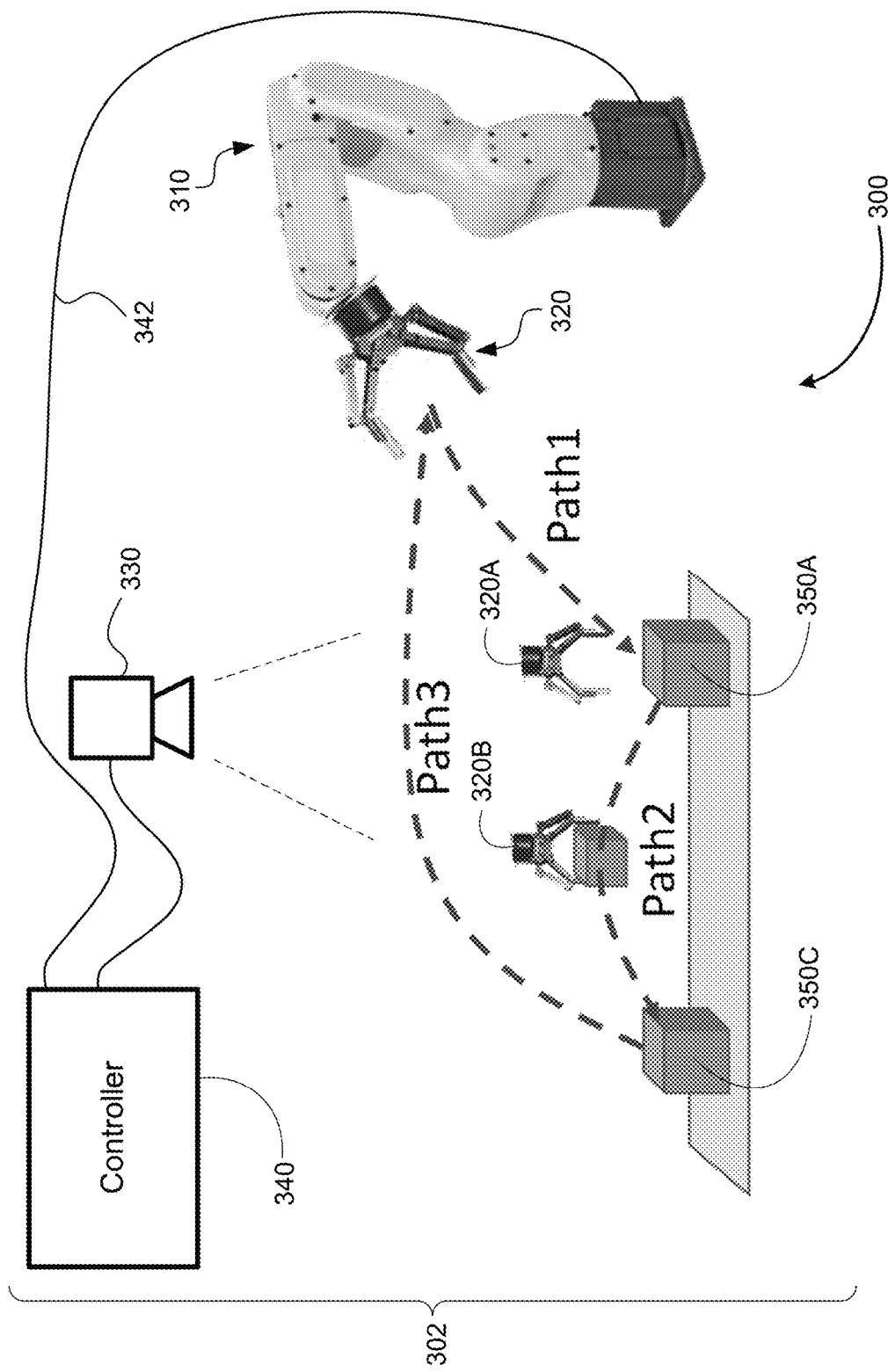
FIG. 3 is an illustration of a system and steps for a robot to perform a pick and place operation using camera images of a workpiece and programming previously taught by human hand demonstration, according to an embodiment of the present disclosure.

FIG. 3 is an illustration of a system 300 and steps for a robot to perform a pick and place operation using camera images of a workpiece and programming previously taught by human hand demonstration, as disclosed in the '185 application and used in an embodiment of the present disclosure. The system 300 is located in a work cell 302, including a camera 330 communicating with a controller 340. These items may or may not be the same as the work cell 202, the camera 210 and the controller 220 shown previously in FIG. 2. In addition to the camera 330 and the controller 340, the work cell 302 includes a robot 310 in communication with the controller 340, typically via a physical cable 342. The robot 310 operates a gripper 320.

The system 300 is designed to "replay" the pick, move and place operations taught by the human operator in the system 200. The hand and workpiece position data recorded in the pick, move and place steps are used to generate robot programming instructions as follows. The robot 310 positions the gripper 320 in a home position, as known by those skilled in the art. The camera 330 identifies a position and orientation of a workpiece 350, which may be located in a tray of parts, for example. The workpiece 350 is shown in positions 350A and 350C in FIG. 3.

From the teaching/demonstration phase discussed above, the controller 220 (FIG. 2) knows the position and orientation of the hand 240 (and thus, from FIG. 1, the position and orientation of the gripper 320) relative to the workpiece 350 to properly grasp the workpiece 350 (the "pick" operation). Path1 is computed as a path to move the gripper 320 from the home position to a pick position which has been computed based on the position and orientation of the workpiece 350. The pick operation takes place at the end of Path1. The gripper 320 is shown as 320A along the Path1 nearing the pick location, and the workpiece 350 is shown as 350A at the pick location.

From the teaching/demonstration phase, the controller 220 knows the position of the workpiece 230 (and thus the workpiece 350) in multiple locations along the move trajectory. Path2 is computed as a path to move the gripper 320A and the workpiece 350A from the pick position along the move trajectory path. In FIG. 3, one of the intermediate positions along the move path shows the gripper 320B.

Path2 ends at the place position recorded during the teaching/demonstration phase. This includes both a position and pose (orientation) of the workpiece 350, corresponding to the workpiece 350C. After the gripper 320 places the workpiece 350 in the place location and orientation, the gripper 320 releases the workpiece 350 and returns to the home position via Path3.

Following is a summary of the disclosed techniques for robot programming by human demonstration which have been described above:

- A human hand is used to demonstrate grasping, moving and placing a workpiece in a teaching/demonstration phase
- Camera images of the hand and the workpiece are analyzed to determine the proper pose and position of a robot gripper relative to the workpiece, based on key points on the hand determined from the camera images
- The proper pose and position of the robot gripper relative to the workpiece are used to generate robot motion commands for a pick-move-place trajectory based on camera images of a workpiece during a replay or execution phase The present disclosure uses the pick-move-place trajectory generation from human demonstration detailed above, and adds IBVS data collection during the demonstration phase plus IBVS control during the replay/execution phase, to provide the precise workpiece placement required for operations such as robotic component assembly.

FIG. 4 is an illustration showing a basic concept of a technique for robot teaching by human demonstration with image-based visual servoing (IBVS), according to an embodiment of the present disclosure. In box 410, human demonstration of the workpiece pick-move-place is performed with camera monitoring, as illustrated in FIG. 2. In box 420, the pick-move-place trajectory is shown, as determined from analysis of the camera images of the human demonstration. A raw trajectory 422 depicts the actual motion of the hand (the coordinate frame which represents the robot gripper) in 3D space, including many small shaky movements and imprecise motions which are typical in human demonstration. A refined trajectory 424 is computed from the raw trajectory 422, such as by proceeding straight up from a pick location to a maximum height, horizontally at the maximum height to a point directly above the place location, and straight down to the place location.

The pick-move-place trajectory from the box 420—preferably the refined trajectory 424—is used in box 430 by a robot (not shown) in the replay or execution phase. This was described in some detail and shown in FIG. 3. Rather than use the trajectory 424 to place the workpiece in its final location, the present disclosure adds IBVS tracking in a final approach section 432 of the trajectory 424. The IBVS tracking detects geometric features of the workpiece in camera images of the robotic execution and compares the actual locations of the geometric features to target or desired locations, and the robot controller uses output signals from the IBVS tracking computation to precisely control the final approach motions of the robot and gripper and thus the final placement of the workpiece. Details of the IBVS calculations and enhancements of the overall method to improve reliability are discussed below.

Image-based visual servoing (IBVS) is a technique which uses feedback information extracted from a vision sensor (visual feedback) to control the motion of a robot. IBVS computes a control signal based on an error between current locations and target locations of selected features in an image plane. IBVS overcomes problems with calibration errors and depth accuracy which are often encountered in robot control methods using 3D camera data.

The fundamental concept of IBVS is to identify geometric features on an object (e.g., a workpiece) and guide the placement of the object so that the geometric features match up with predefined target locations of the features in the image plane. In the simplest case where the geometric feature is a point A, the point A has a location in x-y pixel coordinates in a current camera image, and a target point location B has a different location in x-y pixel coordinates in the camera image plane. The robot moves the object and the location of the point A relative to the target point location B is computed in each successive camera image until the point A matches the target point location B.

Motion of the robot is controlled to accomplish the movement of the point A as follows. The 2D (x-y pixel) error of the location of the point A relative to the target point location B is used to compute a 2D image space velocity vector ΔX. A Jacobian matrix J relates the image space velocity vector ΔX to a 3D robot Cartesian space velocity vector Δq. The Jacobian matrix J is known based on camera projection parameters. The 2D image space velocity, the Jacobian and the 3D Cartesian space velocity are related as follows:

$$\Delta X = J \Delta q \tag{1}$$

Where only the 3D robot Cartesian space velocity vector Δq is unknown.

In order to compute the 3D robot Cartesian space velocity vector Δq, Equation (1) is rearranged as follows:

$$\Delta q = J^{-1} \Delta X \tag{2}$$

Where $J^{-1}$ is the inverse of the Jacobian J.

Many different types of geometric features on the object (workpiece) may be tracked in IBVS. This includes points, lines, circles, other ellipses, cylinders and even irregular shapes where a position error can be computed via a double integral image moment calculation. In general, the use of point features is not robust to variations of a real robotic environment. For example, an apparent position of a point in image space may change due to lighting conditions, and it can be difficult to separate or distinguish different features points because many point features may be located very close together on most objects. On the other hand, IBVS computations associated with complex 2D and 3D shapes can become lengthy, and many objects do not have geometric features such as circles and cylinders which can be used.

In the end, the selection of feature types may be made to best suit a particular object (workpiece) and installation application.

In an example which has been tested extensively using the technique of the present disclosure, a CPU fan for a computer assembly is analyzed. The CPU fan has a generally square outer shape (in top view), with an internal shroud surface (surrounding the fan blades) in the shape of an octagon. Thus, this part lends itself well to using line features for IBVS. As will be shown later, the task of the robot is to pick up the CPU fan unit and install it into the computer chassis, which requires precise placement of the CPU fan unit in order to align the pins and slots which must be engaged when the CPU fan unit is pressed into place.

The target locations of line features on the workpiece (e.g., CPU fan unit) can be determined during the human demonstration of the component assembly. For example, when the hand stops moving at the "place" location, or when the hand moves away and the workpiece is left motionless in the camera images, it is known that the workpiece is in the final installed position, and the target line feature locations in image space can be computed. Determining the target line feature locations is done only once, during the human demonstration phase, and does not require any additional steps for the human demonstrator—merely additional calculations based on the same human demonstration steps illustrated in FIG. 2.

During robotic execution, when the gripper/workpiece are in the final approach section 432 of the trajectory 424 (FIG. 4), IBVS tracking is activated. At this point, the selected line features on the workpiece begin being tracked in camera images. In order to reliably and efficiently identify the appropriate line features in the images, it is helpful to first crop the camera images to eliminate all static background—that is, eliminate anything that is not moving from one image to the next.

The fundamental idea of moving object detection is to subtract an image background model from a current image, and any pixels where the difference is greater than a threshold are kept as an image foreground mask representing what has changed in the current image. Modeling the background using a Gaussian Mixture Models method is known to improve the robustness of detection of moving objects, where a Gaussian distribution is computed, and pixels located within a certain statistical distance of the mean (such as +/−2 sigma) are identified as not changed, while pixels located outside the predefined statistical distance are identified as changed.

The moving object detection can be computed from 2D red/green/blue (RGB) image data or from depth data from a 3D camera. In some environments, RGB image data suffers from problems with shadows cast by the human demonstrator's hand or by the workpiece. The shadows appear as moving objects, which adds unnecessary extra image space to the cropped area to be analyzed. Depth data does not have a shadow problem, but is often noisy, with many small specks or groups of pixels which appear to have changed from one image to the next. In a preferred embodiment, moving object detection is performed on RGB data and depth data separately for each image time step, and the pixels identified as moving in both the RGB data and the depth data (in an "AND" calculation) are used to define the boundary of the image crop. This technique has been shown to work well to provide a cropped image including the human hand and the object/workpiece, but not the shadows or noise.

Another technique which has been found to be helpful in improving the efficiency and robustness of IBVS tracking is to remove line features on the hand of the human demonstrator after the image is cropped using moving object detection. This can be done by taking advantage of the hand detection techniques illustrated in FIG. 1 and described in detail in the '185 application. Specifically, after key structural points (e.g., knuckles) of the fingers and thumb are identified in an image, knowledge of the hand position in the image can be used to remove line features on the hand in two steps. In a first step, line features located between the index finger and the little finger of the hand are removed from the cropped image. This first step may potentially eliminate many line features associated with the edges of the fingers, which clearly are not useful in IBVS positioning of the object (CPU fan). In a second step, line features located within a width tolerance ($\delta$) of the index finger or the thumb are removed. The idea of the second step is to remove line features associated with the edges of the index finger itself and the thumb itself. For example, if a line is detected in an image, and that line is within a distance tolerance of the centerline of the index finger defined by the joint key points (that is, $d<\delta$), then that line is ignored in the IBVS computations. The same concept is applied to lines near the thumb in the second step. Removing line features on the hand speeds up the IBVS computations on the cropped images, as the removed lines do not have to be evaluated to determine if they are one of the lines on the object (CPU fan) which need to be tracked for IBVS-based placement of the object.

Figure 5B:
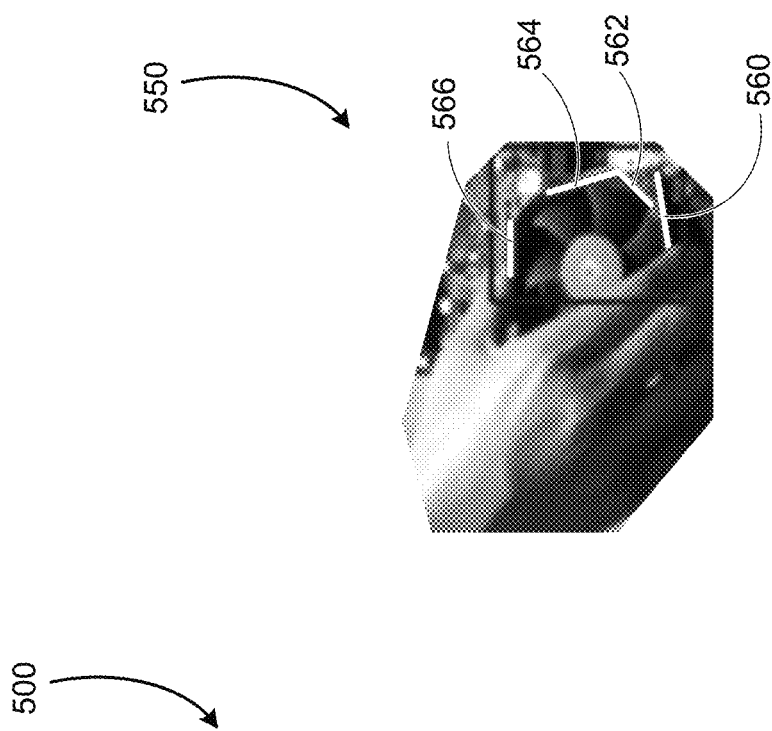
FIG. 5B is a cropped version of the image from FIG. 5A showing line features which have been identified for image-based visual servoing, according to an embodiment of the present disclosure.
Figure 5A:
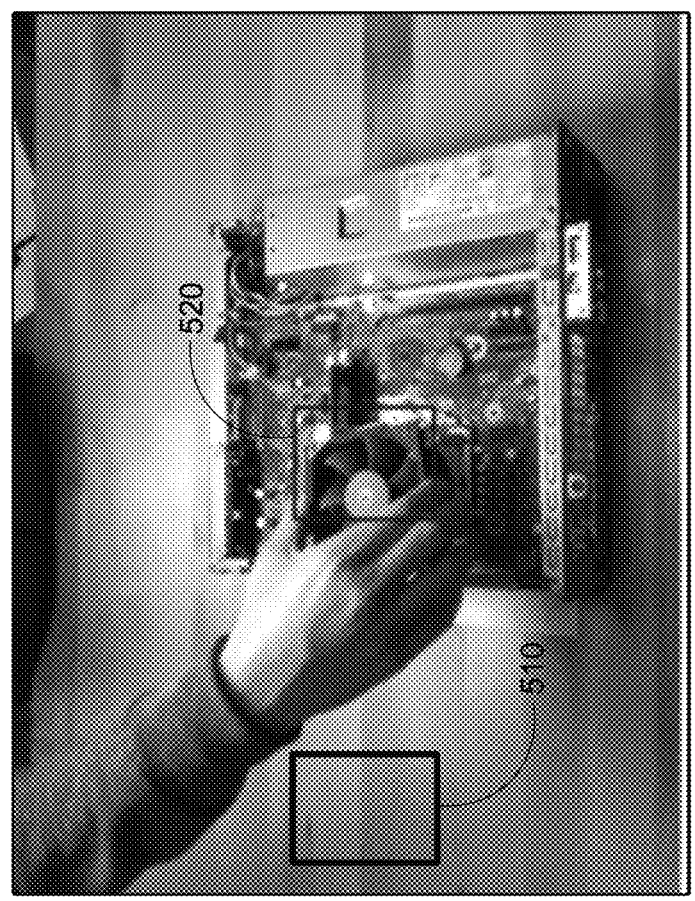
FIG. 5A is an image of a workpiece being installed in an assembly by a human demonstrator.

FIG. 5A is an image 500 of a workpiece being installed in an assembly by a human demonstrator. The workpiece (CPU fan) has been picked up by the hand of the demonstrator from a location indicated by a box 510, off to the side of the assembly (computer chassis). The workpiece has then been moved and placed into its location in the computer chassis, including aligning electrical connectors and mechanical features such as pins/holes. The workpiece is shown in its final installed location in a box 520. As discussed above, the human demonstration phase provides the basic pick-move-place trajectory of the gripper and workpiece, and also provides the opportunity to collect line feature data during workpiece move and identify the desired or target locations of the line features when the workpiece is fitted into its final installed position.

FIG. 5B is an image 550 which is a cropped version of the image from FIG. 5A showing line features which have been identified for image-based visual servoing, according to an embodiment of the present disclosure. The image 550 has been cropped using moving object detection techniques as described above, resulting in the cropped portion of the image 500 essentially including only the demonstrator's hand and the workpiece (CPU fan). After being cropped as shown, line features associated with the demonstrator's hand are removed as described above. This includes removing (ignoring) any line features located between the index and little fingers of the hand, and removing (ignoring) any line features within a tolerance distance of the thumb or index finger of the hand. Line features which remain in the cropped image 550 are used for IBVS tracking as discussed earlier. In the image 550, lines 560, 562, 564 and 566 are identified, all of which are geometric features of the outer frame and shroud of the CPU fan. These are exactly the sort of geometric features that are needed for IBVS tracking.

Images are cropped and analyzed and geometric feature data is collected throughout the human demonstration phase depicted in FIG. 5A, and the target or desired locations of the geometric features (e.g., the lines 560-566) are identified when the hand and the workpiece stop moving and the workpiece is in its final installed position as depicted in FIG. 5B. The line feature data collected during human demonstration is then used for IBVS tracking during the robot replay or execution phase, as discussed below.

Figure 6:
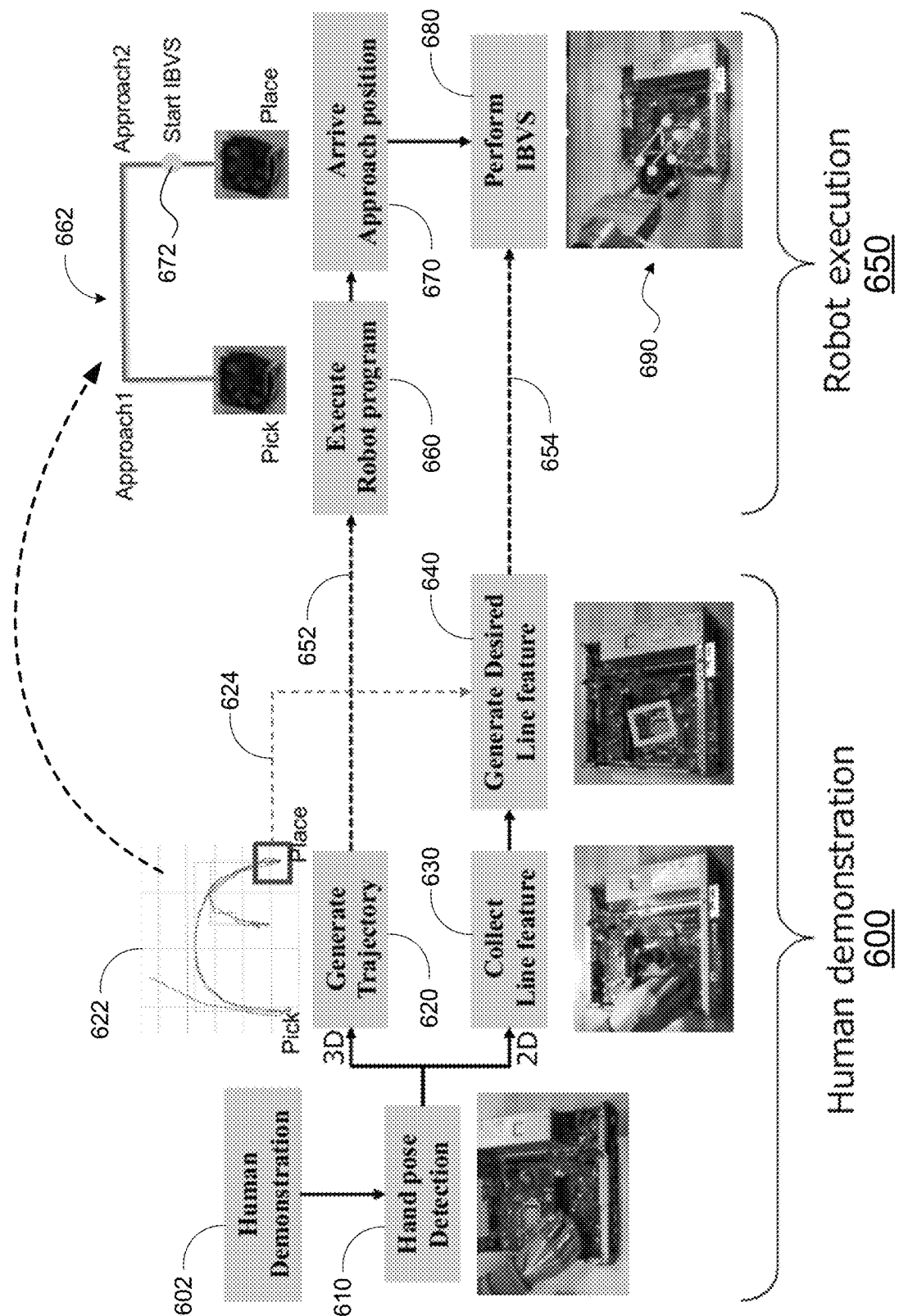
FIG. 6 is an illustration showing details of a technique for robot teaching by human demonstration with image-based visual servoing, according to an embodiment of the present disclosure.

FIG. 6 is an illustration showing details of a technique for robot teaching by human demonstration with image-based visual servoing (IBVS), according to an embodiment of the present disclosure. A human demonstration phase 600 includes the human demonstration of the pick-move-place operation at box 602. At each image frame interval, the hand pose is identified in the image at box 610, where the hand pose is translated into a corresponding gripper pose as discussed above with reference to FIGS. 1 and 2. After the demonstration is completed, the overall 3D pick-move-place trajectory is determined at box 620, as also described above. The resulting trajectory is shown at 622.

Also during the human demonstration phase 600, geometric features on the workpiece are collected from the camera images for image-based visual servoing, at box 630. In the CPU fan example discussed above, line features were chosen to be tracked for IBVS. Other types of geometric features could be used as well, based on the most suitable features present on the workpiece. At box 640, the target or desired line features, representing the line features at the final installed position of the workpiece, are captured. The target or desired line features are captured when the trajectory generation at the box 620 determines that the workpiece has reached the "place" location (has stopped moving), as indicated by line 624. The steps performed in the boxes 630 and 640 were described above in the discussion of FIGS. 5A and 5B. The target or desired line features are 2D lines in coordinates of the image plane of the camera.

A robot execution (or replay) phase 650 is performed using a system as shown in FIG. 3. The overall pick-move-place trajectory from the box 620 is provided on line 652 to the robot controller which executes a robot motion program at box 660. The robot motion program executed at the box 660 causes the robot to pick, move and place the workpiece using a trajectory 662 which corresponds to the trajectory 622 captured during human demonstration. The trajectory 662 used by the robot may be a simplified version (e.g., "up, over and down") of the trajectory 622 captured during demonstration.

At box 670, the robot controller determines that the robot gripper has arrived at a designated approach position, approaching the "place" location. This was illustrated in FIG. 4 and discussed earlier. When the approach position is reached, image-based visual servoing is started, as indicated by point 672 on the trajectory 662. At box 680, IBVS is performed as the robot moves the workpiece on the final approach to the "place" location. During IBVS, camera images of the workpiece are continuously analyzed to identify the current positions of the selected line features. The target or desired line features from the box 640 are provided to the robot controller on line 654 as shown. Robot control signals are generated based on the difference (in camera image plane coordinates) between the current positions of the selected line features and the target or desired positions of the line features. The IBVS control signals cause the robot gripper to place the workpiece in its final installed position (indicated at box 690) with much greater precision than is possible using the trajectory 662 alone.

The robot execution phase 650 can be performed many times based on a single human demonstration phase 600. For example, in the CPU fan installation application discussed herein, after the robot installs the workpiece at the box 690, a new computer chassis (needing a CPU fan) is placed in a fixtured location relative to the IBVS camera, another CPU fan is grasped by the robot (there may be many CPU fans available in a tray for selection, or just one), and the steps of the boxes 660, 670, 680 and 690 are repeated. The robot execution phase can be repeated indefinitely for the trajectory and desired line features which were captured at the boxes 620 and 640, respectively.

Figure 7:
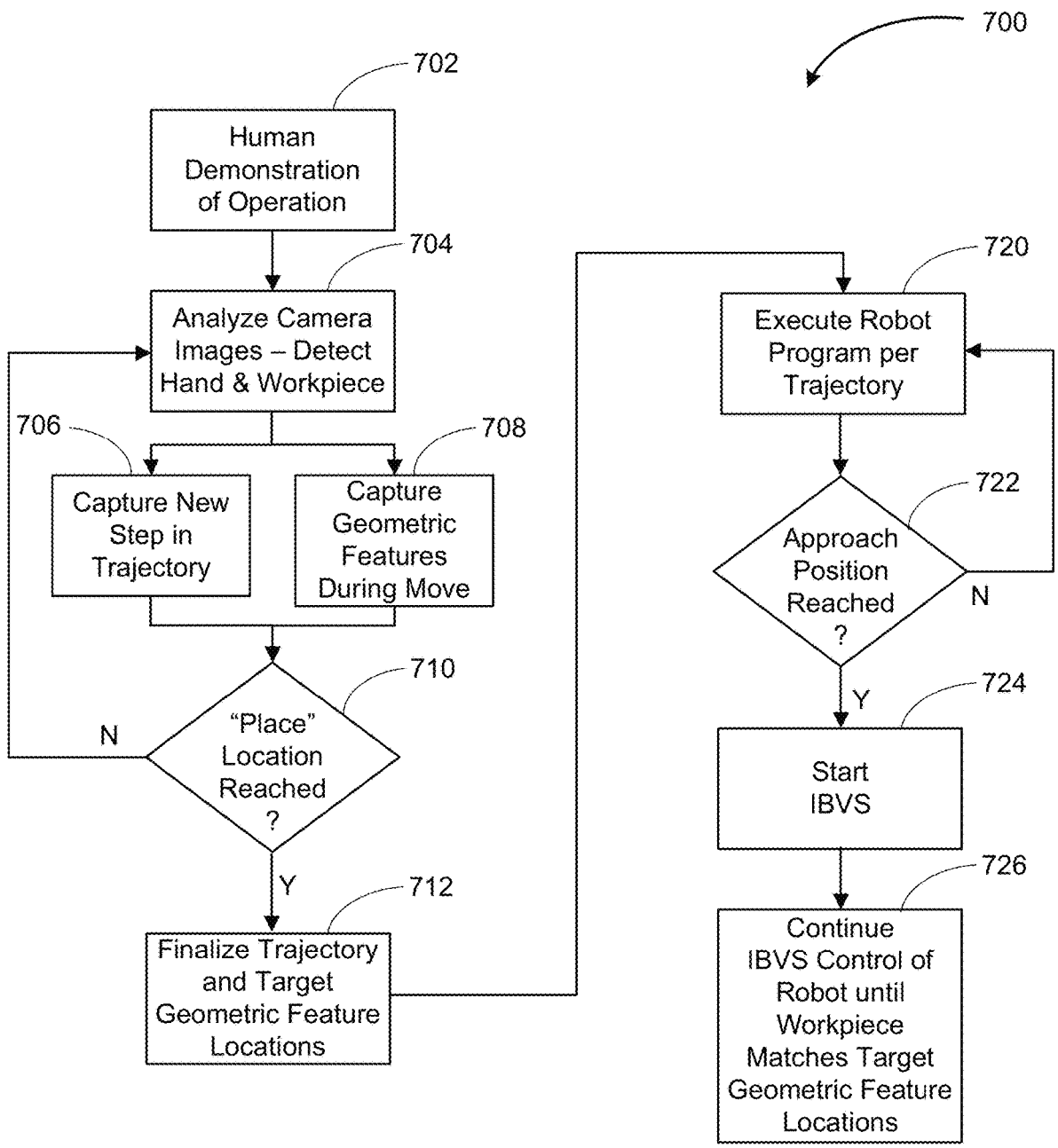
FIG. 7 is a flowchart diagram of a method for robot teaching by human demonstration with image-based visual servoing, including a demonstration phase and a robot execution phase, according to an embodiment of the present disclosure.

FIG. 7 is a flowchart diagram 700 of a method for robot teaching by human demonstration with image-based visual servoing, including a demonstration phase and a robot execution phase, according to an embodiment of the present disclosure. The steps on the left-hand side of FIG. 7, numbered 702-712, represent the human demonstration phase 600 of FIG. 6 and earlier figures. The steps on the right-hand side of FIG. 7, numbered 720-726, represent the robot execution phase 650 of FIG. 6 and earlier figures.

At box 702, a human demonstrates an operation—such as a pick-move-place operation demonstrated by grasping a workpiece, moving it through a desired trajectory and placing it in a destination location. The placing in the destination location may include installing or assembling a component workpiece into a separate structure. At box 704, images of the demonstration from one or more cameras are analyzed to detect hand key points and the workpiece in the images. The hand key point detection and its correlation to a gripper pose were shown in FIG. 1 and discussed earlier.

At box 706, a new step in a move trajectory is added based on the hand and workpiece analysis of the latest image. Details of the trajectory generation—including detection of the grasp action at the pick point and ungrasp action at the place point—were described in the '185 application and also outlined herein above. At box 708, geometric features of the workpiece—such as the line features on the CPU fan discussed above—are captured for the latest camera image. Details of the capturing of geometric features during human demonstration of an operation were discussed above with reference to FIGS. 5 and 6, and shown in particular in the box 630 of FIG. 6.

At decision diamond 710, it is determined whether the place (final) location has been reached. As discussed earlier, the reaching of the place location (the end of the trajectory) can be identified by the hand and/or the workpiece becoming stationary in the camera images. The place location can also be identified by the fingertips of the hand moving away from the workpiece, as described in the '185 application. If the place location has not been reached, the demonstration continues and the process returns to the box 704 to analyze the next camera image. If the place location has been reached, the process moves from the decision diamond 710 to box 712 where the trajectory is finalized and the target (or desired) geometric feature locations are captured. Both the trajectory and the target geometric feature locations are used in the robotic execution phase, as described in detail with reference to FIG. 6.

At box 720, during robotic execution of the demonstrated operation (e.g., workpiece pick-move-place), the robot controller executes a robot program causing the robot gripper to pick up the workpiece and move it in accordance with the trajectory which was generated during human demonstration. The robot program computed by the controller converts the gripper positions and orientations at various points along the trajectory into robot joint velocity commands, such as by using inverse kinematics calculations, as would be understood by one skilled in the art.

At decision diamond 722, it is determined whether the final approach position has been reached in the trajectory.

This concept was illustrated in the box 430 of FIG. 4, and discussed again with reference to the box 670 of FIG. 6. If the final approach position has not yet been reached, then the process loops back to the box 720 to continue following the demonstrated trajectory. If, at the decision diamond 722, the final approach position has been reached, then image-based visual servoing (IBVS) is started at box 724.

At box 726, IBVS control signals are used by the robot controller to position the robot gripper as the workpiece is maneuvered into the final placement or installation position. The IBVS control signals are computed based on the difference between the geometric features identified in a current camera image and the target or desired feature locations, in image plane coordinates. This technique was also described earlier with reference to FIGS. 5 and 6. The process ends when the robot places the workpiece in its final placement or installation position. The robotic execution phase (steps numbered 720 through 726 in FIG. 7) may be repeated many times based on the data captured from the single instance of the human demonstration.

Throughout the preceding discussion, various computers and controllers are described and implied. It is to be understood that the software applications and modules of these computer and controllers are executed on one or more computing devices having a processor and a memory module. In particular, this includes the processors in the robot controllers 220 and 340 discussed above, along with the optional separate computer discussed relative to FIG. 2. Specifically, the processors in the controllers/computer are configured to perform the robot teaching via human demonstration, the IBVS data collection during the teaching phase and the IBVS control of workpiece placement during the execution phase, in the manner discussed above.

As outlined above, the disclosed techniques for robot teaching by human demonstration with image-based visual servoing (IBVS) make robot motion programming faster, easier and more intuitive than previous techniques, while providing the workpiece placement precision needed for robotic component assembly operations.

While a number of exemplary aspects and embodiments of robot teaching by human demonstration with image-based visual servoing (IBVS) have been discussed above, those of skill in the art will recognize modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for programming a robot to perform an operation by human demonstration, said method comprising:
    demonstrating the operation on a workpiece by a human hand;
    analyzing camera images of the hand and the workpiece, by a computer, to create demonstration data;
    adding a new point to a trajectory at each image frame interval based on a hand coordinate frame identified in the demonstration data;
    identifying geometric features on the workpiece in the demonstration data at each image frame interval;
    finalizing the trajectory and capturing target locations of the geometric features when the demonstration of the operation is completed;
    executing a program, by a robot controller, to cause a robot with a gripper to perform the operation on the workpiece using the trajectory;
    starting image-based visual servoing (IBVS) when it is determined that a final approach position has been reached in the trajectory; and
    using IBVS control, by the robot controller, to maneuver the gripper until current locations of the geometric features on the workpiece match the target locations of the geometric features.

2. The method according to claim 1 wherein the geometric features on the workpiece include one or more of points, lines, arcs, ellipses, cylinders and irregular shapes.

3. The method according to claim 1 wherein the geometric features on the workpiece, the current locations and the target locations of the geometric features, are identified in image plane coordinates of the camera images.

4. The method according to claim 1 wherein the demonstration of the operation is completed when it is determined that the workpiece, the hand, or both have stopped moving.

5. The method according to claim 1 wherein identifying geometric features on the workpiece in the demonstration data includes cropping each image frame using moving object detection to include only a portion of the image frame which has changed since a previous image frame.

6. The method according to claim 5 wherein the moving object detection is performed on both two-dimensional (2D) color/intensity data and on three-dimensional (3D) depth data, and the image frame is cropped to include pixels which changed in both the 2D data and the 3D data.

7. The method according to claim 1 wherein identifying geometric features on the workpiece in the demonstration data includes removing geometric features of the human hand before identifying geometric features on the workpiece.

8. The method according to claim 7 wherein removing geometric features of the human hand includes removing geometric features which are located between an index finger and a little finger of the hand, and removing geometric features which are located within a predefined distance tolerance of the index finger or a thumb of the hand.

9. The method according to claim 1 wherein the hand coordinate frame is calculated based on key points on two or more digits of the hand identified in the demonstration data, where the key points include knuckles.

10. The method according to claim 1 wherein using IBVS to maneuver the gripper includes generating robot control signals based on a difference in image plane coordinates between the current locations and the target locations of the geometric features.

11. The method according to claim 1 wherein demonstrating the operation includes installing the workpiece in an assembly via engagement of mechanical features, and the IBVS control by the robot controller causes the gripper to install the workpiece in the assembly via engagement of the mechanical features.

12. The method according to claim 11 further comprising continuously repeating executing the program and using IBVS control to maneuver the gripper, by the controller, on new instances of the workpiece and the assembly.

13. A method for programming a robot to perform an installation operation by human demonstration, said method comprising:
    demonstrating the installation operation of a workpiece into an assembly by a human hand;
    analyzing camera images of the hand and the workpiece, by a computer, to create demonstration data;
    adding a new point to a trajectory at each image frame interval based on a hand coordinate frame identified in the demonstration data;

identifying geometric features on the workpiece in the demonstration data at each image frame interval;

finalizing the trajectory and capturing target locations of the geometric features when the demonstration of the installation operation is completed by mechanically fitting the workpiece into the assembly;

executing a program, by a robot controller, to cause a robot with a gripper to perform the installation operation on the workpiece using the trajectory;

starting image-based visual servoing (IBVS) when it is determined that a final approach position has been reached in the trajectory; and using IBVS control, by the robot controller, to maneuver the gripper until the installation operation is completed by mechanically fitting the workpiece into the assembly, where using IBVS control includes computing a control signal based on a difference between current locations of the geometric features on the workpiece and the target locations of the geometric features.

14. A system for programming a robot to perform an operation by human demonstration, said system comprising:
a camera;
a robot with a gripper; and
a robot controller having a processor and memory, said controller being in communication with the robot and receiving images from the camera, said controller being configured to perform steps including;
analyzing camera images of a human hand demonstrating the operation on the workpiece to create demonstration data;
adding a new point to a trajectory at each image frame interval based on a hand coordinate frame identified in the demonstration data;
identifying geometric features on the workpiece in the demonstration data at each image frame interval;
finalizing the trajectory and capturing target locations of the geometric features when the demonstration of the operation is completed;
executing a program to cause the robot with the gripper to perform the operation on the workpiece using the trajectory;
starting image-based visual servoing (IBVS) when it is determined that a final approach position has been reached in the trajectory; and
using IBVS control to maneuver the gripper until current locations of the geometric features on the workpiece match the target locations of the geometric features.

15. The system according to claim 14 wherein the geometric features on the workpiece include one or more of points, lines, arcs, ellipses, cylinders and irregular shapes.

16. The system according to claim 14 wherein identifying geometric features on the workpiece in the demonstration data includes cropping each image frame using moving object detection to include only a portion of the image frame which has changed since a previous image frame.

17. The system according to claim 14 wherein identifying geometric features on the workpiece in the demonstration data includes removing geometric features of the human hand before identifying geometric features on the workpiece, including removing geometric features which are located between an index finger and a little finger of the hand, and removing geometric features which are located within a predefined distance tolerance of the index finger or a thumb of the hand.

18. The system according to claim 14 wherein using IBVS to maneuver the gripper includes generating robot control signals based on a difference in image plane coordinates between the current locations and the target locations of the geometric features.

19. The system according to claim 14 wherein demonstrating the operation includes installing the workpiece in an assembly via engagement of mechanical features, and the IBVS control by the robot controller causes the gripper to install the workpiece in the assembly via engagement of the mechanical features.

20. The system according to claim 19 further comprising continuously repeating executing the program and using IBVS control to maneuver the gripper on new instances of the workpiece and the assembly.

* * * * *